United States Patent
Cho et al.

(10) Patent No.: US 12,529,132 B2
(45) Date of Patent: Jan. 20, 2026

(54) REFRACTORY ARTICLE, COATING COMPOSITION FOR PREVENTING REDOX REACTION, AND METHOD OF MANUFACTURING A REFRACTORY ARTICLE

(71) Applicant: CORNING INCORPORATED, Corning, NY (US)

(72) Inventors: Myeong-Jin Cho, Yongin-si (KR); Hong-goo Choi, Cheoan-si (KR); Soon-yong Choi, Guri-si (KR); Ki-ju Kwak, Gwangmyeong-si (KR); Yong-won Lee, Cheoan-si (KR); Yun-Kyung Sung, Cheonan-si (KR)

(73) Assignee: CORNING INCORPORATED, Corning, NY (US)

( * ) Notice: Subject to any disclaimer, the term of this patent is extended or adjusted under 35 U.S.C. 154(b) by 4 days.

(21) Appl. No.: 18/300,826

(22) Filed: Apr. 14, 2023

(65) Prior Publication Data
US 2023/0250525 A1    Aug. 10, 2023

Related U.S. Application Data

(62) Division of application No. 16/623,594, filed as application No. PCT/US2018/038064 on Jun. 18, 2018, now Pat. No. 11,674,211.

(30) Foreign Application Priority Data

Jun. 19, 2017  (KR) .............................. 2017-0077447

(51) Int. Cl.
*C03B 5/187*  (2006.01)
*B01F 27/053*  (2022.01)
(Continued)

(52) U.S. Cl.
CPC .............. *C23C 4/11* (2016.01); *B01F 27/053* (2022.01); *B01F 27/0531* (2022.01);
(Continued)

(58) Field of Classification Search
CPC ....... C23C 24/00; C23C 24/103; B01F 27/80; Y02P 40/50; C03B 5/187
See application file for complete search history.

(56) References Cited

U.S. PATENT DOCUMENTS 5,153,070 A  10/1992 Andrus et al.
5,298,332 A   3/1994 Andrus et al.
(Continued)

FOREIGN PATENT DOCUMENTS

CN  1526035 A  9/2004
CN  101044265 A  9/2007
(Continued)

OTHER PUBLICATIONS

Chinese Patent Application No. 201880040685.9, Office Action dated Jul. 5, 2021, 13 pages (5 pages of English Translation and 8 pages of Original Document), Chinese Patent Office.
(Continued)

*Primary Examiner* — Tabassom Tadayyon Eslami
(74) *Attorney, Agent, or Firm* — Kevin M. Able; Yun-Ling Shang; F. Brock Riggs

(57) ABSTRACT

Provided are a refractory article, an anti-redox coating composition, and a method of manufacturing the refractory article. The refractory article includes: a platinum(Pt)-based substrate; and a coating layer for preventing a redox reaction on a surface of the Pt-based substrate, wherein the coating layer for preventing a redox reaction includes on an oxide basis $SiO_2$ in an amount of about 40 wt % to about 70 wt %, $Al_2O_3$ in an amount of about 20 wt % to about 52 wt %,
(Continued)

$B_2O_3$ in an amount of about 3 wt % to about 6 wt %; and CaO in an amount of about 2.4 wt % to about 4.8 wt %.

9 Claims, 5 Drawing Sheets

(51) Int. Cl.
- *B01F 35/512* (2022.01)
- *C03B 5/167* (2006.01)
- *C23C 4/11* (2016.01)
- *C23C 24/10* (2006.01)

(52) U.S. Cl.
CPC .......... *B01F 35/512* (2022.01); *C03B 5/1672* (2013.01); *C03B 5/187* (2013.01); *C23C 24/10* (2013.01)

(56) References Cited

U.S. PATENT DOCUMENTS

| | | |
|---|---|---|
| 2004/0067369 A1 | 4/2004 | Ott et al. |
| 2008/0090087 A1* | 4/2008 | Shoji ............... C03B 5/1672 501/53 |
| 2008/0151687 A1* | 6/2008 | Adelsberg ............ C03B 5/187 366/279 |
| 2011/0072853 A1 | 3/2011 | Beall |
| 2013/0003492 A1 | 1/2013 | Adelsberg et al. |

FOREIGN PATENT DOCUMENTS

| | | |
|---|---|---|
| CN | 103353130 A | 10/2013 |
| CN | 104150771 A | 11/2014 |
| CN | 104163571 A | 11/2014 |
| EP | 0469271 A1 | 2/1992 |
| EP | 1722008 * | 11/2006 |
| EP | 1722008 A2 | 11/2006 |
| GB | 1242996 A | 8/1971 |
| JP | 62-109390 A | 5/1987 |
| JP | 2004-523449 A | 8/2004 |
| JP | 2014-009137 A | 1/2014 |
| JP | 2014009137 * | 1/2014 |
| JP | 5488865 B2 | 5/2014 |
| KR | 10-2007-0053749 A | 5/2007 |
| KR | 10-2008-0005587 A | 1/2008 |
| KR | 10-2012-0026577 A | 3/2012 |
| WO | 2006/030738 A1 | 3/2006 |
| WO | 2011/136109 A1 | 11/2011 |

OTHER PUBLICATIONS

Google machine translation for "EP-1722008-A2" (Year: 2006).
Google machine translation for "KR-20080005587-A" (Year: 2008).
Google machine translation of Ju CN-103353130-A (Year: 2013).
Google machine translation of Murakami JP-2014009137-A (Year: 2014).
International Search Report and Written Opinion of the International Searching Authority; PCT/US2018/038064; Mailed Jan. 25, 2019; 16 Pages; Korean Intellectual Property Office.
Japanese Patent Application No. 2019-569768, Office Action, dated Jun. 29, 2022, 6 pages (3 pages of English Translation and 3 pages of Original Copy); Japanese Patent Office.
Korean Patent Application No. 10-2017-0077447, Notice of Allowance, dated Feb. 14, 2022, 4 pages (2 pages of English Translation and 2 pages of Original Document), Korean Patent Office.
Korean Patent Application No. 10-2017-0077447, Office Action dated Aug. 19, 2021, 14 pages (7 pages of English Translation and 7 pages of Original Document), Korean Patent Office.

* cited by examiner

REFRACTORY ARTICLE, COATING COMPOSITION FOR PREVENTING REDOX REACTION, AND METHOD OF MANUFACTURING A REFRACTORY ARTICLE

This application is a divisional of U.S. patent application Ser. No. 16/623,594 filed on Dec. 17, 2019, which claims the benefit of priority under 35 U.S.C. § 371 of International Application No. PCT/US18/38064, filed on Jun. 18, 2018, which claims the benefit of priority of Korean Patent Application Ser. No. 10-2017-0077447 filed on Jun. 19, 2017 the contents of which are relied upon and incorporated herein by reference in their entirety as if fully set forth below.

TECHNICAL FIELD

The inventive concept relates to a refractory article, a coating composition for preventing redox reaction, and a method of manufacturing the refractory article, and more particularly, to a refractory article capable of reducing defective products caused due to platinum particles and bubbling effect, an anti oxidation-reduction coating composition, and a method of manufacturing the refractory article.

BACKGROUND

In processes of manufacturing glass products, once operation of a manufacturing apparatus begins, operation of the manufacturing apparatus are typically maintained for years in a steady state. Therefore, it is difficult to stop or pause the operation to identify the cause or causes of a defect. Generation of bubbles or a mixture of opaque articles in glass products may cause defects, and thus, it is important to reduce or eliminate the formation of such defects.

SUMMARY

According to embodiments of the disclosure, there is provided a refractory article including: a platinum (Pt)-based substrate and a coating layer for preventing a redox reaction (i.e., anti-redox coating layer) on a surface of the Pt-based substrate, wherein the coating layer may include, on an oxide basis, $SiO_2$ in an amount of about 40 wt % to about 70 wt %, $Al_2O_3$ in an amount of about 20 wt % to about 52 wt %, $B_2O_3$ in an amount of about 3 wt % to about 6 wt %; and CaO in an amount of about 2.4 wt % to about 4.8 wt %. The coating layer may include whiskers distributed in a silica matrix. In some embodiments, the whisker may comprise a mullite crystalline phase.

In some embodiments, the refractory article may be a stir chamber comprising an internal surface of Pt-based substrate, and wherein the coating layer is at least partially coated on the internal surface of the stir chamber.

In some embodiments, the coating layer may include, on an oxide basis, $SiO_2$ in an amount of about 40 wt % to about 60 wt %; $Al_2O_3$ in an amount of about 32 wt % to about 52 wt %; $B_2O_3$ oxide in an amount of about 3 wt % to about 6 wt %; and CaO in an amount of about 2.4 wt % to about 4.8 wt %.

The refractory article may further include a stirrer, wherein the coating layer may be at least partially coated on a side surface of the stirrer.

In some embodiments, the refractory article may be a tube comprising a surface of a Pt-based substrate, and wherein the coating layer may be coated on at least a portion of the external surface of the tube.

In some embodiments, the coating layer may include, on an oxide basis, $SiO_2$ in an amount of about 60 wt % to about 70 wt %; $Al_2O_3$ in an amount of about 20 wt % to about 30 wt %; $B_2O_3$ in an amount of about 3 wt % to about 6 wt %; and CaO in an amount of about 2.4 wt % to about 4.8 wt %.

The coating layer may further include a network modifier in an amount of about 1 wt % to about 7 wt %.

According to embodiments disclosed herein, there is provided an anti oxidation-reduction coating composition including: a first refractory material including, on an oxide basis, $SiO_2$ in an amount from about 55 wt % to about 70 wt %; $Al_2O_3$ in an amount from about 12 wt % to about 22 wt %; $B_2O_3$ in an amount from about 5 wt % to about 15 wt %; and CaO in an amount from about 5 wt % to about 10 wt %; a second refractory material containing $SiO_2$ as a main component; and a third refractory material containing $Al_2O_3$ as a main component, wherein an amount of the second refractory material is about 25 parts by weight to about 130 parts by weight and an amount of the third refractory material is about 20 parts by weight to about 150 parts by weight with respect to the first refractory material in an amount of 100 parts by weight.

The coating composition may be for coating an internal surface of a stir chamber, and the amount of the second refractory material may be about 25 parts by weight to about 115 parts by weight and the amount of the third refractory material is about 45 parts by weight to about 150 parts by weight with respect to the first refractory material in an amount of 100 parts by weight.

The coating composition may be for coating an external surface of a tube, and the amount of the second refractory material may be about 33 parts by weight to about 90 parts by weight and the amount of the third refractory material is about 20 parts by weight to about 45 parts by weight with respect to the first refractory material in an amount of 100 parts by weight.

According to embodiments of the present disclosure, there is provided a method of fabricating a refractory article, the method including: applying a slurry coating layer on an article including a platinum (Pt)-based substrate, the slurry including a first refractory material, a second refractory material, and a third refractory material, the first refractory material containing $SiO_2$ in an amount of about 55 wt % to about 70 wt %, $Al_2O_3$ in an amount of about 12 wt % to about 22 wt %, $B_2O_3$ in an amount of about 5 wt % to about 15 wt %, and CaO in an amount of about 5 wt % to about 10 wt %, the second refractory material containing $SiO_2$ as a main component, and the third refractory material containing $Al_2O_3$ as a main component; and heat treating the slurry coating layer, thereby forming the refractory article.

In some embodiments, the slurry may be applied by a spray method. The spray method may, for example, be performed simultaneously with homogenizing the slurry at a supply source of the slurry.

The heat treating may be performed at a temperature in a range from about 1350° C. to about 1550° C. for a time in a range from about 30 hours to about 100 hours.

After the heat treating, a micro-structure including particles of mullite crystals dispersed in a silica matrix may be resulted from the slurry coating layer by the heat treating.

In some embodiments, the slurry may include the second refractory material in an amount of about 25 parts by weight to about 130 parts by weight and the third refractory material in an amount of about 20 parts by weight to about 150 parts by weight with respect to the first refractory material in an amount of 100 parts by weight.

In some embodiments, the article may be a stir chamber, and the slurry may include the second refractory material in an amount of about 25 parts by weight to about 115 parts by weight and the third refractory material in an amount of about 45 parts by weight to about 150 parts by weight with respect to the first refractory material in an amount of 100 parts by weight.

In some embodiments, the article may be a tube, and the slurry may include the second refractory material in an amount of about 33 parts by weight to about 90 parts by weight and the third refractory material in an amount of about 20 parts by weight to about 45 parts by weight with respect to the first refractory material in an amount of 100 parts by weight.

DETAILED DESCRIPTION

Figure 1A:
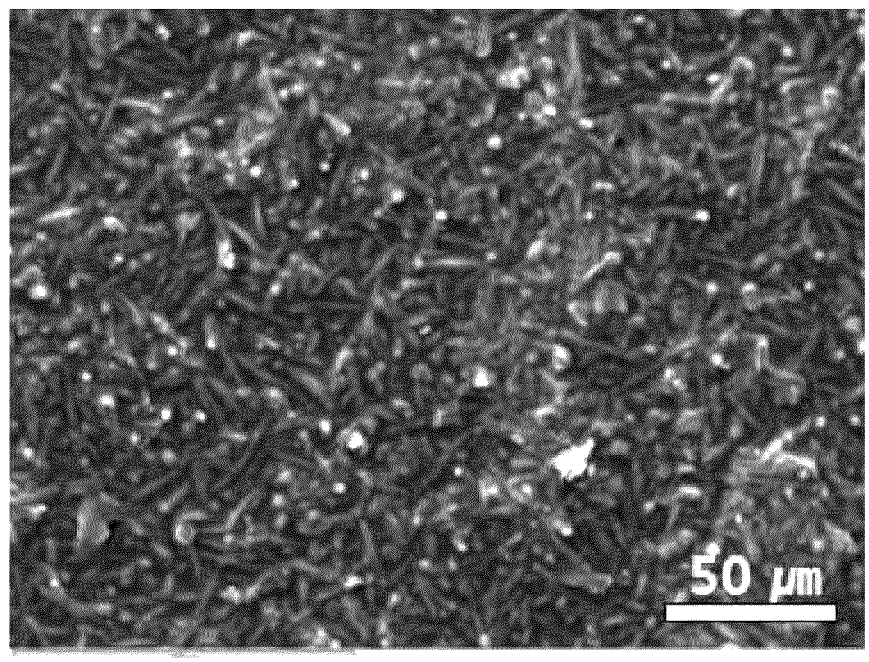
FIG. 1A is a captured image of a structure, in which whiskers are distributed in a surface of a silica matrix in an anti-redox coating layer, according to an embodiment.

The disclosure will now be described more fully with reference to the accompanying drawings, in which exemplary embodiments are shown. The subject matter of the disclosure may, however, be embodied in many different forms and should not be construed as being limited to the exemplary embodiments set forth herein; rather, these embodiments are provided so that this disclosure will be thorough and complete, and will fully convey the subject matter to those skilled in the art. In the drawings, the thicknesses of layers and regions may be exaggerated for clarity. Wherever possible, like reference numerals in the drawings will denote like elements. Therefore, the disclosure is not limited by relative sizes or intervals as shown in the accompanied drawings.

While such terms as "first," "second," etc., may be used to describe various components, such components are not limited to the above terms. The above terms are used only to distinguish one component from another. For example, a first component may indicate a second component or a second component may indicate a first component without conflicting.

The terms used herein in various exemplary embodiments are used to describe exemplary embodiments only, and should not be construed to limit the various additional embodiments. Singular expressions, unless defined otherwise in contexts, include plural expressions. The terms "comprises" or "may comprise" used herein in various exemplary embodiments may indicate the presence of a corresponding function, operation, or component and do not limit one or more additional functions, operations, or components. It will be further understood that the terms "comprises" and/or "comprising," when used in this specification, may be used to specify the presence of stated features, integers, steps, operations, elements, and/or components, but do not preclude the presence or addition of one or more other features, integers, steps, operations, elements, components, and/or groups thereof.

When a certain embodiment may be implemented differently, a specific process order may be performed differently from the described order. For example, two consecutively described processes may be performed substantially at the same time or performed in an order opposite to the described order.

Variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. As used herein, the term "and/or" includes any and all combinations of one or more of the associated listed items. In addition, in this specification, "substrate" may denote the substrate itself, or a stacked structure including the substrate and a one or more coatings, layers or films formed on a surface of the substrate. Also, in the present specification, "a surface of a substrate" may denote an exposed surface of the substrate, or an external surface of a coating, layer or film formed on the substrate.

According to embodiments disclosed herein, a refractory article including a platinum-based substrate and an anti-redox coating layer coated on a surface of the platinum-based substrate is provided. The refractory article may be any product exposed to a high temperature environment, e.g., to a temperature of 1200° C. to 1750° C., for example, products such as conduits, chambers, crucibles, etc. used to manufacture glass products, or components thereof.

The platinum-based substrate may be a substrate including platinum (Pt) as a main component. The platinum-based substrate may be a pure Pt substrate or an alloy of Pt and other metal component such as aluminum (Al), titanium (Ti), vanadium (V), chromium (Cr), manganese (Mn), iron (Fe), cobalt (Co), nickel (Ni), copper (Cu), zinc (Zn), gallium (Ga), zirconium (Zr), molybdenum (Mo), ruthenium (Ru), palladium (Pd), tin (Sn), antimony (Sb), bismuth (Bi), and/or tungsten (W). In the present specification, "main component" defines a component having a component ratio exceeding 50 wt %. For example, that the main component of the platinum-based substrate is Pt may denote that an amount of Pt in the platinum-based substrate exceeds 50 wt %.

The anti-redox coating layer may include $SiO_2$ in an amount of about 40 wt % to about 70 wt %, $Al_2O_3$ in an amount of about 20 wt % to about 52 wt %, $B_2O_3$ in an amount of about 3 wt % to about 6 wt %; and CaO in an amount of about 2.4 wt % to about 4.8 wt %.

If the amount of $SiO_2$ is too large, the coating layer may not be evenly coated. On the other hand, if the amount of $SiO_2$ is too small, the amount of $Al_2O_3$ increases and the coating layer may be easily delaminated.

The anti-redox coating layer may have a structure in which whiskers are distributed in a $SiO_2$ matrix. In particular, the whiskers may comprise a mullite crystalline phase.

FIG. 1A is a captured image of a such structure, in which whiskers are distributed on a surface of a $SiO_2$ matrix in the anti-redox coating layer according to an embodiment.

Figure 1B:
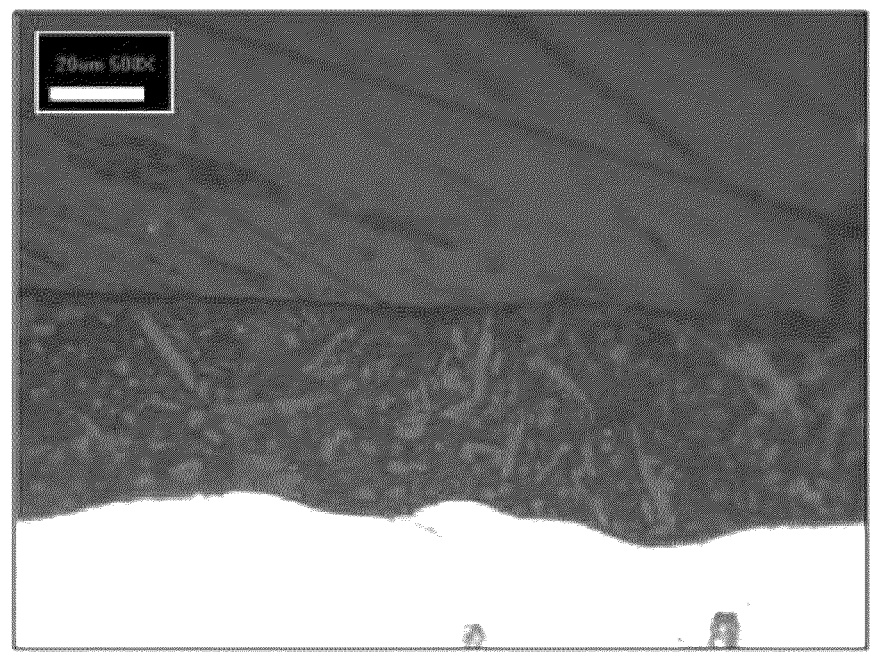
FIG. 1B is a captured image of a cross-sectional structure, in which whiskers are distributed in a silica matrix of an anti-redox coating layer, according to an embodiment.

FIG. 1B is a captured image of a cross-section of such a structure, in which the whiskers are distributed in the $SiO_2$ matrix of the anti-redox coating layer according to the embodiment.

Referring to FIG. 1A, whisker-type particles are concentrated in high density. Referring to FIG. 1B, the whisker-type particles may be relatively evenly distributed in the $SiO_2$ matrix.

In addition, the whisker particles comprising mullite crystalline phases may be identified through an energy dispersive X-ray spectroscopy (EDS) and an X-ray diffraction (XRD) analysis.

Figure 2:
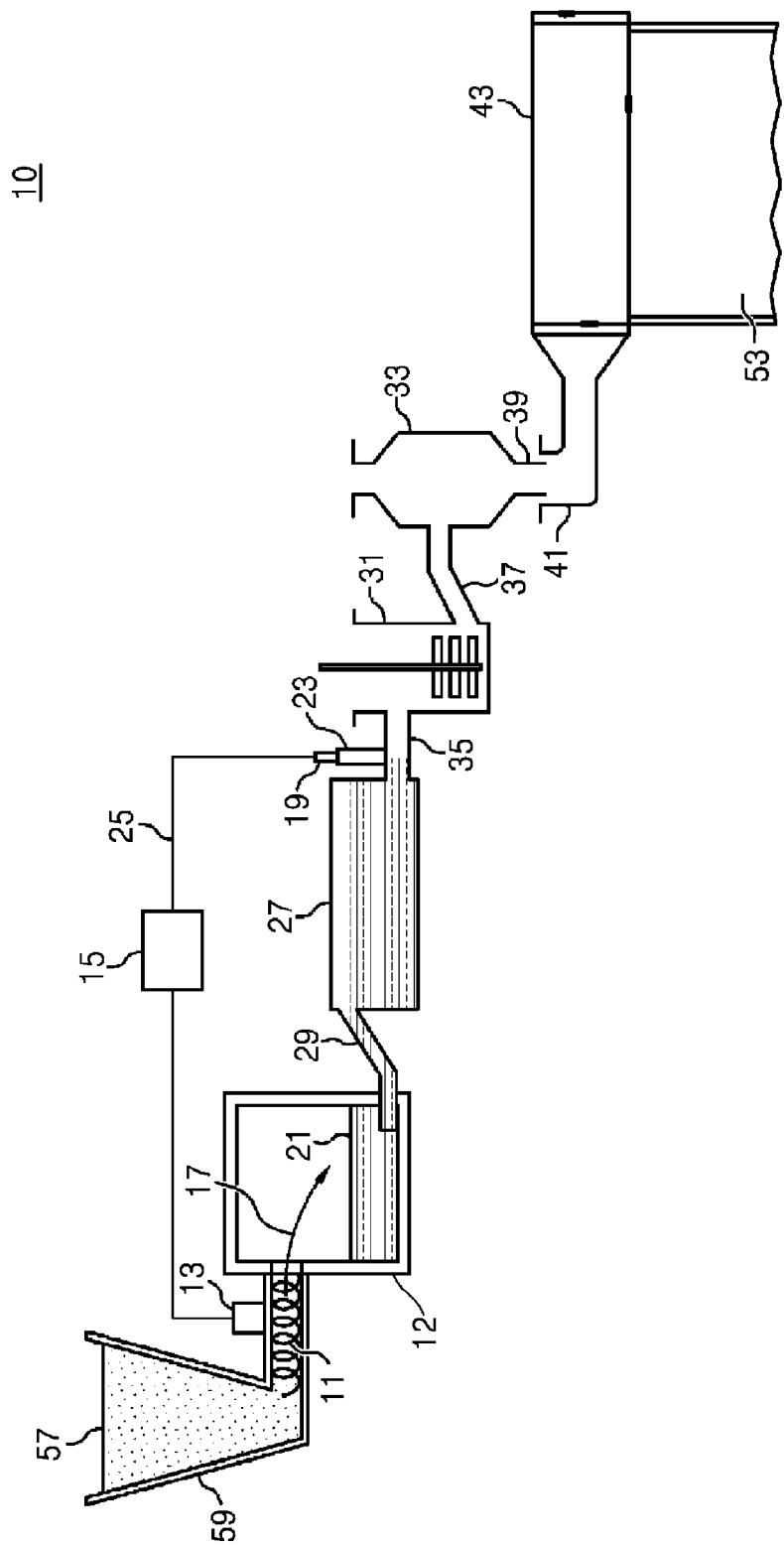
FIG. 2 is a processing diagram conceptually showing a glass sheet manufacturing apparatus, to which a refractory article according to the embodiments may be applied.

FIG. 2 is a processing diagram conceptually showing a glass sheet manufacturing apparatus 10, to which the refractory article according to the embodiments of the disclosure may be applied.

Referring to FIG. 2, the glass sheet manufacturing apparatus 10 may include a melting vessel 12 configured to receive a batch material 37 supplied from a storage bin 59. The batch material 57 may be introduced into the melting vessel 12 by a batch conveying device 11 that is driven by a motor 13. A controller 15 may control the motor 13 so that the batch material 57 of a desired amount may be introduced into the melting vessel 12, as denoted by an arrow 17. A glass level probe 19 measures a level of a glass melt 21 in a stand pipe 23, and may communicate with the controller 15 to send measured level information via a communication line 25.

The glass sheet manufacturing apparatus 10 may include a fining vessel 27, e.g., a fining tube, which is located downstream of the melting vessel 12 relative to the flow of molten glass and is in fluid communication with the melting vessel 12 via a first connection tube 29. In addition, a mixing vessel 31, e.g., a stir chamber, may be located downstream of the fining vessel 27, and a delivery vessel 33 may be located downstream of the mixing vessel 31. As shown in the drawing, a second connection tube 35 may connect the fining vessel 27 to the mixing vessel 31, and a third connection tube 37 may connect the mixing vessel 31 to the delivery vessel 33. A downcomer 39 may be located to transfer the glass melt 21 from the delivery vessel 33 to an inlet tube 41 of a molding apparatus 43.

At least a part of the melting vessel 12, for example, at least a part of an inner wall, may include the refractory article described above. The glass sheet manufacturing apparatus 10 may further include components that generally include platinum or platinum-containing metal, for example, platinum-rhodium, platinum-iridium, and a combination thereof, but the components may also include molybdenum, palladium, rhenium, tantalum, titanium, tungsten, ruthenium, osmium, zirconium, and an alloy thereof, and/or refractory metals such as zirconium dioxide. The platinum-containing components may include at least one of the first connection tube, the fining vessel 27 (e.g., the fining tube), the second connection tube 35, the stand pipe 23, the mixing vessel 31 (e.g., the stir chamber), the third connection tube 37, the delivery vessel 33, the downcomer 39, and the inlet tube 41. Also, at least a part of the molding apparatus 43 may include the refractory article as described above, or may be designed to form a glass ribbon 53.

Figure 3:
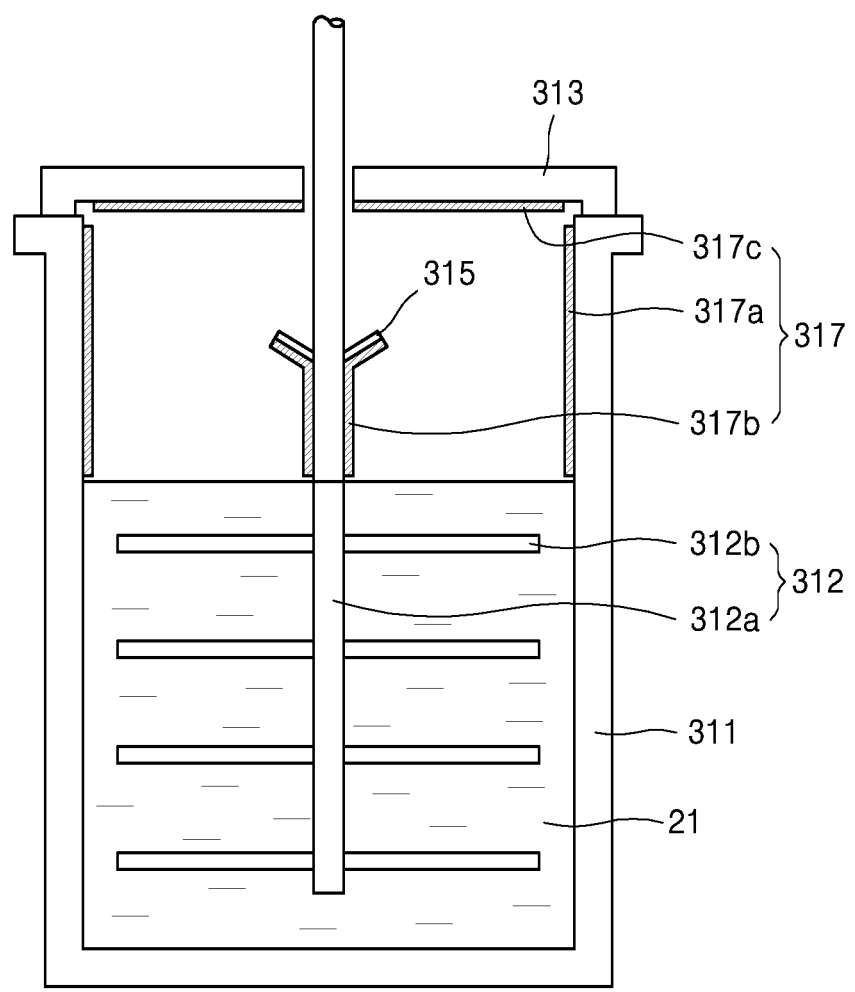
FIG. 3 is a conceptual diagram of a refractory article according to an embodiment, and in particular, showing a mixing vessel in the manufacturing apparatus of FIG. 2.

FIG. 3 is a conceptual diagram of a refractory article according to an embodiment, and in particular, the mixing vessel 31 in the manufacturing apparatus 10 of FIG. 2.

Referring to FIG. 3, the glass melt 21 may be homogeneously mixed by a stirrer 312 in the mixing vessel 31. The mixing vessel 31 receives a supply of the glass melt 21 from the fining vessel 27 as shown in FIG. 2, mixes the glass melt 21, and then transfers the glass melt 21 to the delivery vessel 33. A temperature in the mixing vessel 31 may range from about 1400° C. to about 1500° C. The stirrer 312 may include a shaft 312a and one or more impellers 312b attached to the shaft 312a.

A catcher plate 315 may be provided at the shaft 312a. The catcher plate 315 may prevent impurities from falling through a gap between a vessel cover 313 and the shaft 312a and being included in the glass melt 21.

In particular, a vessel body 311, the vessel cover 313, and the stirrer 312 of the mixing vessel 31 may include entirely or at least partially platinum or a platinum alloy in order to manufacture high purity glass products having thermal resistance with respect to high temperature processing conditions. Platinum may oxidize under a high temperature environment to form platinum oxide ($PtO_2(g)$) of a gas phase. However, the $PtO_2$ gas may condense and/or be chemically reduced in a relatively low temperature area in the mixing vessel 31 or adjacent to the mixing vessel 31, and then, may be mixed into the glass melt 21, typically in the form of narrow needles of solid platinum. Since the platinum Pt(s) has a very high melting point, if the platinum Pt(s) is mixed in the glass melt 21, it may cause defects in the resultant glass products. The above reaction may be dependent upon temperature, flow rate of a gas-phase flow, and $O_2$ concentration in the gas-phase flow, and it is estimated that the above reaction can actively occur along an upper inside surface of the mixing vessel 31 that is not in contact with the glass melt 21.

Therefore, an inner wall surface of the vessel body 311 may be coated with an anti-redox coating layer 317a according to embodiments. In particular, the anti-redox coating layer 317a may be coated on the wall surface of the vessel body 311 that is at a higher level than an upper surface (free surface) of the glass melt 21.

In addition, an anti-redox coating layer 317b according to the embodiment may be coated on a lower surface of the catcher plate 315 and on an exterior surface of the shaft 312a under the catcher plate 315. The anti-redox coating layer 317b may be coated only on portions higher than the upper interface of the glass melt 21.

Moreover, an anti-redox coating layer 317c according to the embodiment may be coated on a lower (e.g., inward facing) surface of the vessel cover 313.

The anti-redox coating layers 317a, 317b, and 317c may each include $SiO_2$ in an amount of about 40 wt % to about 60 wt %, $Al_2O_3$ in an amount of about 32 wt % to about 52 wt %, $B_2O_3$ in an amount of about 3 wt % to about 6 wt %, and CaO in an amount of about 2.4 wt % to about 4.8 wt %.

If the amount of $SiO_2$ is too high or the amount of $Al_2O_3$ is too low, the coating may not be evenly formed. If the amount of $SiO_2$ is too low or the amount of alumina is too high, thermal shock resistance of the coating may degrade or the coating layer may be easily delaminated.

When the anti-redox coating layer 317 coated on the inner wall, etc. of the mixing vessel 31 has a composition within the above range, inclusion of platinum particles in the glass melt due to the oxidation-reduction of the platinum substrate and generation of defective products may be reduced.

As a result of analyzing causes of defects, when it is assumed that a defective ratio according to the prior art due to the platinum particles is 1.0 in an arbitrary unit (A.U.), the defective ratio due to the platinum particles was reduced to 0.4 A.U. when the anti-redox coating layer 317 is coated on the inner wall, etc. of the mixing vessel 31.

Figure 4:
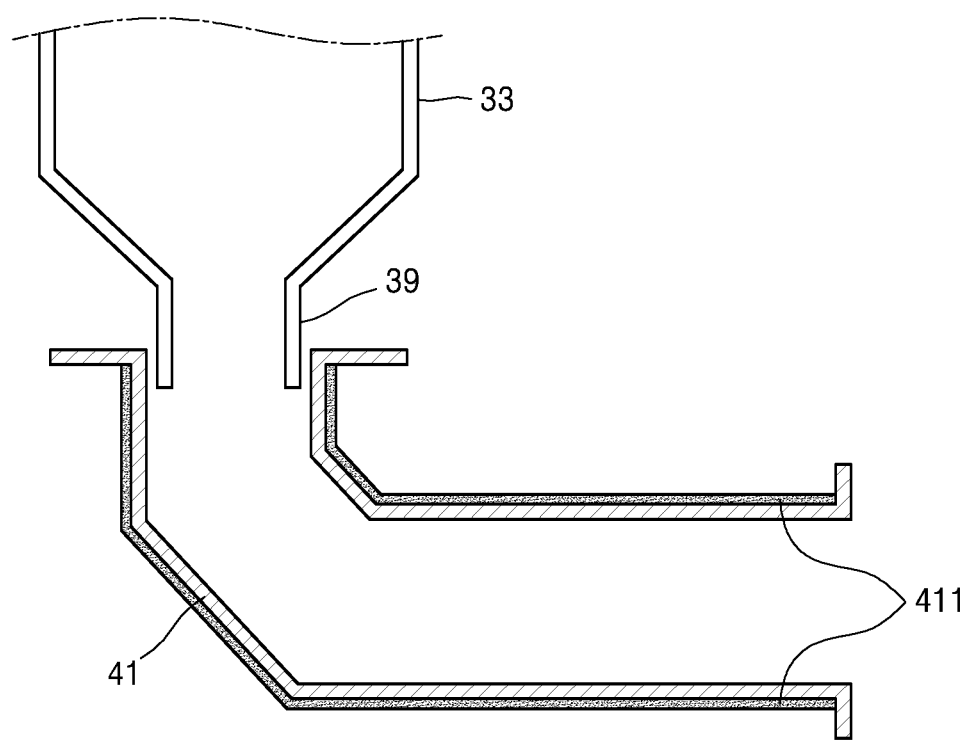
FIG. 4 is a conceptual diagram of a refractory article according to another embodiment, showing an inlet tube in the manufacturing apparatus of FIG. 2.

FIG. 4 is a conceptual diagram of a refractory article according to another embodiment, and in particular, shows the inlet tube 41 in the manufacturing apparatus 10 of FIG. 2.

Referring to FIG. 4, the glass melt 21 (see FIG. 2) is transferred from the delivery vessel 33 to the inlet tube 41 via the downcomer 39. In addition, the glass melt 21 transferred to the inlet tube 41 may be sent to the molding apparatus 43 to be formed as the glass ribbon 53.

While the disclosure should not be bound by any theory, it is believed that the bubble forming surface blistering effect which occurs in apparatus employing platinum-containing component occurs as a result of formation of an oxygen rich layer near the platinum-glass melt interface. This oxygen rich layer in the glass is believed to be produced by a combination of electrochemical and chemical reactions. These include thermoelectric electrolysis of the melt, breakdown of multivalent oxides and the breakdown of OH groups and water dissolved in the glass. The latter effect is believed to have the largest impact on the rate of oxygen enrichment at the platinum-glass interface and the subsequent generation of surface blisters (bubbles) at that interface. It is believed that at glass producing temperatures, a portion of the OH groups dissociate into neutral hydrogen and oxygen. When the partial pressure of hydrogen at the platinum component-glass interface (inside the component) is greater than the partial pressure of hydrogen on the outside of the platinum containing components (i.e., the portion of the component not in contact with the glass), hydrogen can then leave the glass by permeation through the platinum skin. This loss of hydrogen causes an enrichment of the surface region (platinum contacting region) of the glass with oxygen which can then form bubbles if the solubility limit of the glass is exceeded.

An external surface of the inlet tube 41 may be coated by an anti-redox coating layer 411 according to the embodiment. Application of an appropriate coating to the exterior surface of the platinum-containing components, such as the inlet tube 41, may reduce the rate of hydrogen-permeation through the platinum-containing metal. This in turn can reduce or eliminate bubble generation. The anti-redox coating should be less contracted in volume for crystallization even under high temperature, and should not react with the platinum-containing components, which may lead to an exposure of the platinum metal in the platinum-containing components.

The anti-redox coating layers 411 may each include $SiO_2$ in an amount of about 60 wt % to about 70 wt %; $Al_2O_3$ in an amount of about 20 wt % to about 30 wt %; $B_2O_3$ in an amount of about 3 wt % to about 6 wt %; and CaO in an amount of about 2.4 wt % to about 4.8 wt %.

When the anti-redox coating layers 411 coated on an outer wall of the inlet tube 41 have compositions within the above range, the coating layers may not be delaminated at the high temperature and may effectively prevent the platinum-based substrate from being exposed, by preventing the reaction between the anti-redox coating layer 411 and the platinum-containing components while maintaining excellent coating quality. Accordingly, bubbling in the glass melt that passes through the inlet tube 41 may be prevented, wherein the bubbling results from the oxidation-reduction (redox) reaction of hydroxyl group.

If the amount of $SiO_2$ is too high or the amount of $Al_2O_3$ is too low, the coating may be unevenly formed. In addition, if the amount of $SiO_2$ is too low or the amount of $Al_2O_3$ is too high, durability and the ability of the coating layer to limit, such as eliminate, hydrogen-permeation may degrade or the coating layer may be easily delaminated.

The anti-redox coating layers 411 may each further include a network modifier. The network modifier may be, for example, an alkali metal oxide or an alkali earth metal oxide, but is not limited thereto. For example, the network modifier may be SrO or a frit. The network modifier may be included in the anti-redox coating layer in an amount of about 1 wt % to about 7 wt %, but is not limited thereto.

If the amount of the network modifier is too low, effect of improving coating quality such as preventing delamination may be insufficient. If the amount of the network modifier is too high, durability and the ability to limit, such as eliminate, hydrogen-permeation may degrade.

Hereinafter, structures and effects of embodiments disclosed herein will be described in detail with reference to Experimental Examples and Comparative Examples, but the Experimental Examples are provided so that this disclosure will be thorough and complete and scope and is therefore not limited to the Experimental Examples.

EXPERIMENTAL EXAMPLE 1

A first refractory material including $SiO_2$ in an amount of 63 wt %, $Al_2O_3$ in an amount of 17 wt %, $B_2O_3$ in an amount of 10 wt %, CaO in an amount of 8 wt %, and SrO in an amount of 2 wt % was prepared. In addition, $SiO_2$ was prepared as a second refractory material, and $Al_2O_3$ was prepared as a third refractory material.

The first refractory material in an amount of 43 wt %, the second refractory material in an amount of 26 wt %, and the third refractory material in an amount of 31 wt % were mixed by a ball milling method. These may be converted into the second refractory material in an amount of about 60.5 parts by weight and the third refractory material in an amount of about 72.1 parts by weight, with respect to 100 parts by weight of the first refractory material. Deionized (DI) water was used as a solvent, and methyl cellulose of about 2% of the entire weight was added in order to adjust viscosity.

An anti-redox coating composition prepared as above was coated on a platinum specimen by a spraying coating method, and the composition was continuously agitated while the spray coating was performed in order to prevent phase separation of the composition. The thickness of the coating composition was adjusted to have a thickness of about 80 μm after being dried.

After that, heat treating of the coated specimen was performed at a temperature of 1450° C. for 72 hours, and images of a surface and a cross-section of the coating layer were captured and are shown in FIGS. 1A and 1B.

EXPERIMENTAL EXAMPLES 2 TO 9

An anti-redox coating layer was formed on a platinum specimen in the same way as the above Experimental Example 1, except for a mixture ratio of the first to third refractory materials as shown in Table 1 below.

COMPARATIVE EXAMPLES 1 TO 7

An anti-redox coating layer was formed on a platinum specimen in the same way as above Experimental Example 1, except for a mixture ratio of the first to third refractory materials as shown in Table 1 below.

Mixture ratios of the refractory materials applied to the Experimental Examples 1 to 9 and the Comparative Examples 1 to 7 and compositions of coating layers obtained therefrom are shown in Table 1 below.

TABLE 1

| | D1 | D2 | D3 | silica | alumina | $B_2O_3$ | CaO | SrO |
|---|---|---|---|---|---|---|---|---|
| Experimental Example 1 | 43 | 26 | 31 | 53.1 | 38.3 | 4.3 | 3.4 | 0.86 |
| Experimental Example 2 | 55 | 15 | 30 | 49.7 | 39.4 | 5.5 | 4.4 | 1.1 |
| Experimental Example 3 | 55 | 20 | 25 | 54.7 | 34.4 | 535 | 4.4 | 1.1 |
| Experimental Example 4 | 50 | 15 | 35 | 46.5 | 43.5 | 5.0 | 4.0 | 1 |
| Experimental Example 5 | 30 | 35 | 35 | 53.9 | 40.1 | 3.0 | 2.4 | 0.6 |
| Experimental Example 6 | 30 | 50 | 20 | 68.9 | 25.1 | 3.0 | 2.4 | 0.6 |
| Experimental Example 7 | 50 | 35 | 15 | 66.5 | 23.5 | 5.0 | 4.0 | 1 |
| Experimental Example 8 | 30 | 25 | 45 | 43.9 | 50.1 | 3.0 | 2.4 | 0.6 |
| Experimental Example 9 | 41 | 15 | 44 | 40.8 | 51.0 | 4.1 | 3.3 | 0.82 |
| Comparative Example 1 | 55 | 35 | 10 | 69.7 | 19.4 | 5.5 | 4.4 | 1.1 |
| Comparative Example 2 | 25 | 25 | 50 | 40.8 | 54.3 | 2.5 | 2.0 | 0.5 |
| Comparative Example 3 | 46 | 10 | 44 | 39.0 | 51.8 | 4.6 | 3.7 | 0.92 |
| Comparative Example 4 | 25 | 55 | 20 | 70.75 | 24.3 | 2.5 | 2 | 0.5 |
| Comparative Example 5 | 30 | 55 | 15 | 73.9 | 20.1 | 3 | 2.4 | 0.6 |
| Comparative Example 6 | 45 | 45 | 10 | 73.35 | 17.65 | 4.5 | 3.6 | 0.9 |
| Comparative Example 7 | 40 | 10 | 50 | 35.2 | 56.8 | 4 | 3.2 | 0.8 |

(unit: wt %)

In Table 1 above, D1 denotes the first refractory material, D2 denotes the second refractory material, and D3 denotes the third refractory material.

With respect to the specimens of the Experimental Examples 1 to 9 and the Comparative Examples 1 to 7, heat treating was performed at a temperature of 1450° C. for 14 days (=336 hours) in order to evaluate durability of the coating layers. Then, the coating layer was checked to determine if there had been a change in microstructure.

In addition, in FIG. 3, the mixing vessel 31 receives a thermal shock due to an enormous variation in the temperature, when the vessel cover 313 or the stirrer 312 is replaced. For example, the mixing vessel 31 was identified to receive a thermal shock of about 100° C. when the vessel cover 313 was replaced, and a thermal shock of about 300° C. when the stirrer 312 was replaced. To evaluate tolerance with respect to the thermal shock, testing for thermal shock was performed repeatedly three times with conditions of temperature variation of 400° C. and temperature variation speed of 20° C./min.

If there was no delamination and no cracking, the result was evaluated as ⊚, if there was no delamination and cracking occurred locally, the result was evaluated as O, if the delamination occurred but the coated specimen surface was not exposed, the result was evaluated as Δ, and if the delamination occurred so that the coated specimen surface was exposed, the result was evaluated as X.

Results of observing changes occurring in the microstructure and results of thermal shock tests with respect to the Experimental Examples 1 to 9 and the Comparative Examples 1 to 7 are shown in Table 2 below.

TABLE 2

| | Changes in microstructure | Thermal shock test |
|---|---|---|
| Experimental Example 1 | X | ⊚ |
| Experimental Example 2 | X | ⊚ |
| Experimental Example 3 | X | ⊚ |
| Experimental Example 4 | X | ⊚ |
| Experimental Example 5 | X | ⊚ |
| Experimental Example 6 | X | ⊚ |
| Experimental Example 7 | X | ⊚ |
| Experimental Example 8 | X | ⊚ |
| Experimental Example 9 | X | ⊚ |
| Comparative Example 1 | O | O |
| Comparative Example 2 | X | Δ |
| Comparative Example 3 | X | Δ |
| Comparative Example 4 | O | O |
| Comparative Example 5 | O | Δ |
| Comparative Example 6 | O | X |
| Comparative Example 7 | X | X |

As shown in Tables 1 and 2 above, when the amount of $SiO_2$ is less than 40 wt % or the amount of $Al_2O_3$ exceeds 52 wt %, it was observed that the microstructure changed and the thermal shock resistance became insufficient or bad (Comparative Examples 2, 3, and 7).

In addition, when the amount of $SiO_2$ exceeds 70 wt % or the amount of $Al_2O_3$ is less than 20 wt %, there were some cases in which the thermal shock property was fair (Comparative Examples 1 and 4), but there were also some cases in which the thermal shock property was bad or insufficient (Comparative Examples 5 and 6). Moreover, in this case, it was observed the microstructure was changed, which suggested that there is a possibility of generating additional cracks according to changes in the processing and operating conditions.

EXPERIMENTAL EXAMPLE 10

A first refractory material including $SiO_2$ in an amount of 63 wt %, $Al_2O_3$ in an amount of 17 wt %, $B_2O_3$ in an amount of 10 wt %, CaO in an amount of 8 wt %, and SrO in an amount of 2 wt % was prepared. In addition, $SiO_2$ was prepared as a second refractory material, and alumina was prepared as a third refractory material.

The first refractory material in an amount of 55 wt %, the second refractory material in an amount of 33 wt %, and the third refractory material in an amount of 12 wt % were mixed by a ball milling method. These may be converted into the second refractory material in an amount of about 60 parts by weight and the third refractory material in an amount of about 21.8 parts by weight, with respect to 100 parts by weight of the first refractory material. DI water was used as a solvent, and methyl cellulose was added about 2% of the entire weight in order to adjust viscosity.

The anti-redox coating composition prepared above was coated on an external surface of the inlet tube (e.g., inlet tube 41). The coating was performed by a spray coating method, and the composition was continuously agitated while the spray coating was performed in order to prevent phase separation of the composition. The thickness of the coating composition was adjusted to have a thickness of about 60 μm after being dried. Then, a heat treatment was performed for two hours at a temperature of 1400° C. The above processes of the spray coating, drying, and heat treating were repeatedly performed three times.

EXPERIMENTAL EXAMPLES 11 TO 20

An anti-redox coating layer was formed on an external surface of an inlet tube in the same way as above Experimental Example 10, except for a mixture ratio of the first to third refractory materials as shown in Table 3 below.

In particular, in Experimental Examples 15 and 16, a network modifier (RO) was added in an amount of 2 wt % and in an amount of 5 wt %, respectively. In the Experimental Example 15, SrO was added as the network modifier, and in the Experimental Example 16, a frit was added as the network modifier. In order to add the SrO as the network modifier in the Experimental Example 15, strontium nitrate ($Sr(NO_3)_2$) in a corresponding amount was added in the DI water to be included in the anti-redox coating composition. In the Experimental Example 15, the amount of strontium oxide that is additionally added as the network modifier was 2 wt % and an amount of strontium oxide originating from the first refractory material was 1.08 wt %, and thus, an entire amount of strontium oxide was 3.08 wt %.

In addition, mixture ratios of the first to third refractory materials in Experimental Examples 17 to 20 were the same as those of the Experimental Examples 6 to 9.

COMPARATIVE EXAMPLES 8 TO 14

An anti-redox coating layer was formed on an external surface of an inlet tube in the same way as above Experimental Example 10, except for a mixture ratio of the first to third refractory materials. Mixture ratios of the first to third refractory materials in Comparative Examples 8 to 14 were the same as those of the Comparative Examples 1 to 7.

Mixture ratios of the refractory materials applied to the Experimental Examples 10 to 20 and the Comparative Examples 8 to 14 and compositions of coating layers obtained therefrom are shown in Table 3 below.

TABLE 3

| | D1 | D2 | D3 | silica | alumina | $B_2O_3$ | CaO | SrO | RO |
|---|---|---|---|---|---|---|---|---|---|
| Experimental Example 10 | 55 | 33 | 12 | 67.7 | 21.4 | 5.5 | 4.4 | 1.1 | 0 |
| Experimental Example 11 | 50 | 30 | 20 | 61.5 | 28.5 | 5.0 | 4.0 | 1.0 | 0 |
| Experimental Example 12 | 50 | 25 | 25 | 56.5 | 33.5 | 5.0 | 4.0 | 1.0 | 0 |
| Experimental Example 13 | 30 | 40 | 30 | 58.9 | 35.1 | 3.0 | 2.4 | 0.6 | 0 |
| Experimental Example 14 | 50 | 33 | 17 | 64.5 | 25.5 | 5.0 | 4.0 | 1.0 | 0 |
| Experimental Example 15 | 54 | 32 | 12 | 66.0 | 21.2 | 5.4 | 4.3 | 1.1 | 2 |
| Experimental Example 16 | 53 | 31 | 11 | 64.4 | 20.0 | 5.3 | 4.2 | 1.1 | 5 |
| Experimental Example 17 | 30 | 50 | 20 | 68.9 | 25.1 | 3.0 | 2.4 | 0.6 | 0 |
| Experimental Example 18 | 50 | 35 | 15 | 66.5 | 23.5 | 5.0 | 4.0 | 1.0 | 0 |
| Experimental Example 19 | 30 | 25 | 45 | 43.9 | 50.1 | 3.0 | 2.4 | 0.6 | 0 |
| Experimental Example 20 | 41 | 15 | 44 | 40.8 | 51.0 | 4.1 | 3.3 | 0.8 | 0 |
| Comparative Example 8 | 55 | 35 | 10 | 69.7 | 19.4 | 5.5 | 4.4 | 1.1 | 0 |
| Comparative Example 9 | 25 | 25 | 50 | 40.8 | 51.0 | 4.1 | 3.3 | 0.8 | 0 |
| Comparative Example 10 | 46 | 10 | 44 | 39.0 | 51.8 | 4.6 | 3.7 | 0.9 | 0 |
| Comparative Example 11 | 25 | 55 | 20 | 70.8 | 24.3 | 2.5 | 2.0 | 0.5 | 0 |
| Comparative Example 12 | 30 | 55 | 15 | 73.9 | 20.1 | 3.0 | 2.4 | 0.6 | 0 |
| Comparative Example 13 | 45 | 45 | 10 | 73.4 | 17.7 | 4.5 | 3.6 | 0.9 | 0 |
| Comparative Example 14 | 40 | 10 | 50 | 35.2 | 56.8 | 4.0 | 3.2 | 0.8 | 0 |

(unit: wt %)

In order to evaluate durability of the coating layers, heat treating was performed at a temperature of 1200° C. for 14 days (=336 hours). Then, it was checked whether there was an exposure of the platinum surface resulting from a volume contraction or a reaction with the refractory. If the coating layer had a flat surface and the platinum surface was not exposed at all, the evaluation result was ⊚, if the coating layer had an uneven surface locally and the platinum surface was not exposed at all, the evaluation result was O, if the coating layer had entirely uneven surface even though the platinum surface was not exposed, the evaluation result was Δ, if the platinum surface was at least partially exposed, the evaluation result was X.

The coating quality of the coating layer was evaluated based on delamination, cracking, and thickness thereof. If the coating layer was transparent, had no delamination or cracking, and had an even thickness, the evaluation result was ⊚, if the coating layer had a low transparency, had no delamination or cracking, and had an even thickness, the evaluation result was O, if a cover layer is delaminated or cracked, the evaluation result was Δ, and if the delamination was made so that the platinum surface was exposed, the evaluation result was X.

Hydrogen-permeation was evaluated by measuring a concentration of oxygen ions in the glass melt. A partial pressure of oxygen equal to or greater than 1 atmosphere (atm) was evaluated as X, an oxygen partial pressure equal to or greater than 0.1 atm and less than 1 atm was evaluated as Δ, an oxygen partial pressure equal to or greater than 0.01 atm and less than 0.1 atm was evaluated as O, and an oxygen partial pressure less than 0.01 atm was evaluated as ⊚.

Results of evaluating the coating quality, the durability, and the hydrogen-permeation property examined with respect to the Experimental Examples 10 to 20 and the Comparative Examples 8 to 14 are shown in Table 4 below.

TABLE 4

| | Coating quality | Durability | Hydrogen-permeation |
|---|---|---|---|
| Experimental Example 10 | ⊚ | ⊚ | ⊚ |
| Experimental Example 11 | ⊚ | ⊚ | ⊚ |
| Experimental Example 12 | ⊚ | O | ⊚ |
| Experimental Example 13 | ⊚ | O | ⊚ |
| Experimental Example 14 | ⊚ | ⊚ | ⊚ |
| Experimental Example 15 | ⊚ | ⊚ | ⊚ |
| Experimental Example 16 | ⊚ | ⊚ | ⊚ |
| Experimental Example 17 | ⊚ | ⊚ | ⊚ |
| Experimental Example 18 | ⊚ | ⊚ | ⊚ |
| Experimental Example 19 | ⊚ | O | ⊚ |
| Experimental Example 20 | ⊚ | O | ⊚ |
| Comparative Example 8 | X | O | O |
| Comparative Example 9 | Δ | Δ | Δ |
| Comparative Example 10 | O | X | X |
| Comparative Example 11 | X | O | O |
| Comparative Example 12 | X | Δ | O |
| Comparative Example 13 | X | Δ | Δ |
| Comparative Example 14 | Δ | X | X |

As illustrated in Tables 3 and 4 above, when the amount of $SiO_2$ was less than 40 wt % or the amount of $Al_2O_3$ exceeded 52 wt %, it was identified that durability degraded and the hydrogen-permeation blocking property was inferior (Comparative Examples 9, 10, and 14). In addition, when the amount of $SiO_2$ exceeded 70 wt % or the amount of $Al_2O_3$ was less than 20 wt %, it was identified that the coating quality was inferior (Comparative Examples 8, and 11 to 13).

Figure 5:
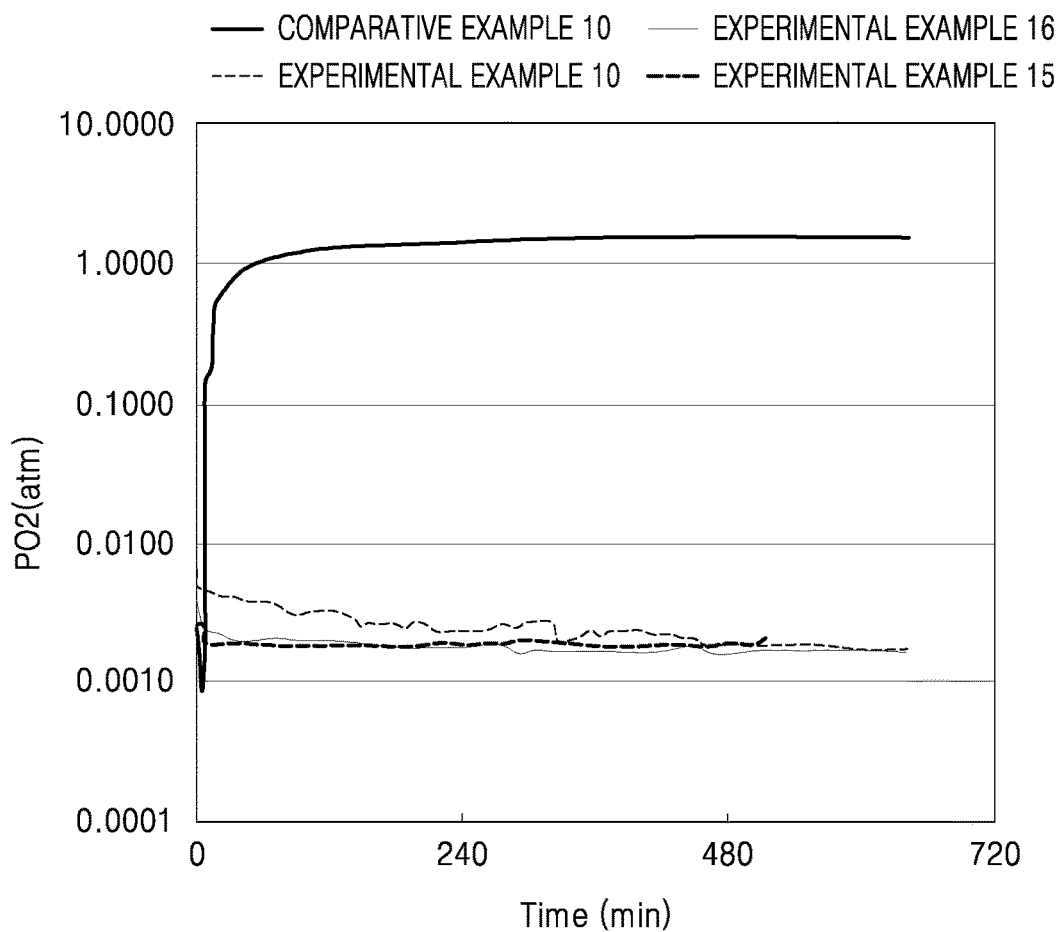
FIG. 5 is a graph of oxygen partial pressures according to time lapse with respect to Experimental Example 10, Experimental Example 15, Experimental Example 16, and Comparative Example 10.

Progresses of the oxygen partial pressure according to time lapse with respect to the Experimental Examples 10, 15, and 16 and the Comparative Example 10 are shown in FIG. 5. As shown in FIG. 5, the oxygen partial pressure in the Comparative Example 10 exceeds 1 atm, but in the Experimental Examples 10, 15, and 16, the oxygen partial pressures were measured less than 0.01 atm. This denotes that the hydrogen-permeation rarely occurred in the Experimental Examples 10, 15, and 16.

Hereinafter, the above anti-redox coating composition will be described in detail below.

The anti-redox coating composition may include a first refractory material, a second refractory material, and a third refractory material, and an amount of the second refractory material may be about 25 parts by weight to about 130 parts by weight and an amount of the third refractory material may be about 20 parts by weight to about 150 parts by weight with respect to the first refractory material in an amount of 100 parts by weight.

Here, the first refractory material may include, on an oxide basis, $SiO_2$ in an amount from about 55 wt % to about 70 wt %, $Al_2O_3$ in an amount from about 12 wt % to about 22 wt %, $B_2O_3$ in an amount from about 5 wt % to about 15 wt %, and CaO in an amount from about 5 wt % to about 10 wt %. In addition, the second refractory material may be a mixture containing $SiO_2$ as a main component, or $SiO_2$. In addition, the third refractory material may be a mixture containing $Al_2O_3$ as a main component, for example, alumina. As described above, in the present specification, "main component" defines a component having a component ratio exceeding 50 wt %. For example, that the main component of the second refractory material is $SiO_2$ denotes that an amount of the silica in the second refractory material exceeds 50 wt %.

In some embodiments, the anti-redox coating composition may be a composition for coating an internal surface of the stir chamber. In this case, the anti-redox coating composition may include the second refractory material in an amount of about 25 parts by weight to about 115 parts by weight and the third refractory material in an amount of about 45 parts by weight to about 150 parts by weight, with respect to the first refractory material in an amount of 100 parts by weight.

In some other embodiments, the anti-redox coating composition may be a composition for coating an external surface of a tube. In this case, the anti-redox coating composition may include the second refractory material in an amount of about 33 parts by weight to about 90 parts by weight and the third refractory material in an amount of about 20 parts by weight to about 45 parts by weight with respect to the first refractory material in an amount of 100 parts by weight.

If the amount of the third refractory material is too large or the amount of the second refractory material is too small when compared with the amount of the first refractory material, the durability of the coating layer and the hydrogen-permeation blocking property may degrade or the coating layer may be easily delaminated. If the amount of the second refractory material is too large or the amount of the third refractory material is too small when compared with the amount of the first refractory material, the coating may be unevenly formed.

The first, second, and third refractory materials may be dispersed in a dispersion medium as powder. The dispersion medium may be hydrophilic liquid such as water, $C_1$-$C_5$ alcohol-based solvent, $C_2$-$C_8$ glycol-based solvent, etc. Here, such above liquid may be referred to as "solvent", but the above liquid actually disperse the first, second, and third refractory materials therein, without dissolving the first to third refractory materials, and thus, the liquid may be actually "dispersion medium" (dispersant).

The anti-redox coating composition may further include alkali metal salts or alkali earth metal salts as a source material for forming the network modifier. The alkali metal salts or the alkali earth metal salts may be, for example, strontium nitrate ($Sr(NO_3)_2$), but are not limited thereto. The alkali metal salts or the alkali earth metal salts may be dissolved in the solvent. The anti-redox coating composition may include a source material in an amount of about 1 wt % to about 7 wt % for forming the network modifier.

Figure 6:
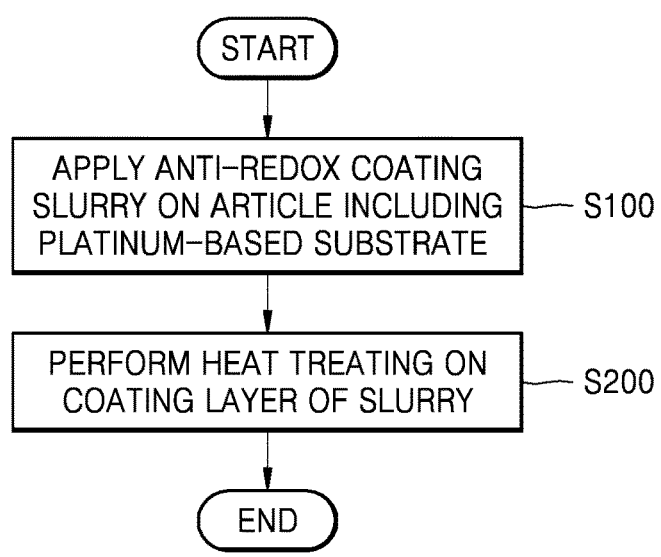
FIG. 6 is a flowchart of a method of manufacturing a refractory article, according to an embodiment.

Hereinafter, a method of manufacturing the refractory article will be described below. FIG. 6 is a flowchart of the method of manufacturing the refractory material, according to an embodiment.

Referring to FIG. 6, a layer of an anti-redox coating slurry is formed on an article, for example, an article including a platinum-containing substrate (S100). The anti-redox coating slurry may include the first refractory material, the second refractory material, and the third refractory material. The first to third refractory materials are described above in detail, and thus, descriptions thereof are omitted here.

The anti-redox coating slurry may include the second refractory material in an amount of about 25 parts by weight to about 130 parts by weight and the third refractory material in an amount of about 20 parts by weight to about 150 parts by weight with respect to the first refractory material in an amount of 100 parts by weight. The platinum-based substrate is described above in detail, and detailed descriptions thereof are omitted here. The anti-redox coating slurry may be the anti-redox coating composition described above.

The layer of the anti-redox coating slurry may be formed by spraying, brushing, doctor blade, and other appropriate methods, and is not limited thereto.

The layer of the anti-redox coating slurry may be adjusted to have a thickness of about 10 μm to about 500 μm after a heat treating. To do this, the layer of the anti-redox coating slurry before the heat treating may be appropriately adjusted to have a thickness of about 15 μm to about 700 μm. If the layer is too small in thickness, the ability of the cotaing to limit, such as eliminate, hydrogen-permeation may be insufficiently obtained. On the other hand, if the layer is too large in thickness, it is not economically appropriate and a part of the coating layer may fall off, thereby causing defective products. One of ordinary skill in the art would appropriately have selected the thickness of the layer of the anti-redox coating slurry, taking the above factors into account.

Phase separation may easily occur in the anti-redox coating composition, according to a composition thereof. Thus, the anti-redox coating composition needs to be continuously homogenized by using a method such as agitation, in order to form a uniform coating layer.

In addition, heat treating the layer of the anti-redox coating slurry may be performed (S200). The heat treating may be performed at a temperature in a range from about 1350° C. to about 1550° C. for a time period in a range from about 30 hours to about 100 hours. If the heat treating is performed at an excessively low temperature or for a short period of time, the coating layer may have a low strength and may not be able to sufficiently prevent the hydrogen-permeation. On the other hand, if the heat treating is performed at an excessively high temperature or for a long period of time, the coating layer may be delaminated and defective products may increase. One of ordinary skill in the art would appropriately have selected the temperature and the period of time for performing the heat treating, taking the above factors into account.

Through the heat treating, a structure in which mullite crystallized particles are distributed in a silica matrix may be obtained.

The applying of the slurry (S100) and the performing of the heat treating (S200) may be respectively repeated twice or more as a cycle. The number of repeating the cycle may be, for example, two to ten.

In some embodiments, the anti-redox coating slurry may include the second refractory material in an amount of about 25 parts by weight to about 115 parts by weight and the third refractory material in an amount of about 45 parts by weight to about 150 parts by weight, with respect to the first refractory material in an amount of 100 parts by weight. In this case, the slurry may be used to coat an internal wall surface of the stir chamber for agitating the glass melt, a side surface of the stirrer, and/or an internal surface of the cover of the stir chamber.

In some embodiments, the anti-redox coating slurry may include the second refractory material in an amount of about 33 parts by weight to about 90 parts by weight and the third refractory material in an amount of about 20 parts by weight to about 45 parts by weight, with respect to the first refractory material in an amount of 100 parts by weight. In this case, the slurry may be used to coat an external surface of the tube for transferring the glass melt.

While the present disclosure has been particularly shown and described with reference to exemplary embodiments thereof, it will be understood that various changes in form and details may be made therein without departing from the spirit and scope of the following claims.

What is claimed is:

1. A method of fabricating a mixing vessel, the method comprising:
   applying a slurry coating layer on at least a portion of an inner wall surface of a vessel body of the mixing vessel, the inner wall surface comprising platinum or a platinum alloy, wherein the slurry coating layer is only applied to portions of the inner wall surface above an upper interface of a glass melt with the inner wall surface, the slurry coating layer comprising a first refractory material, a second refractory material, and a third refractory material, the first refractory material comprising on an oxide basis:
   $SiO_2$ in an amount of 60 wt % to 70 wt %;
   $Al_2O_3$ in an amount of 20 wt % to 30 wt %;
   $B_2O_3$ in an amount of 3 wt % to 6 wt %; and
   CaO in an amount of 2.4 wt % to 4.8 wt %, the second refractory material containing $SiO_2$ as a main component, and the third refractory material containing alumina as a main component; and
   heat treating the slurry coating layer, thereby forming the refractory article, wherein the refractory article comprises a coating layer comprising whiskers distributed in a silica matrix, and the whiskers comprise a mullite crystalline phase; wherein:
   the mixing vessel comprises a stirrer comprising a shaft, one or more impellers attached to the shaft, and a catcher plate provide at the shaft; and
   the method further comprises applying the slurry coating layer to a lower surface of the catcher plate.

2. The method of claim 1, wherein applying the slurry coating layer is performed by a spray method.

3. The method of claim 2, wherein the spray method is performed simultaneously with homogenizing the slurry at a supply source of the slurry.

4. The method of claim 1, wherein the heat treating is performed at a temperature in a range from 1350° C. to 1550° C. for a time in a range from 30 hours to 100 hours.

5. The method of claim 1, wherein, after the heat treating, a micro-structure including particles of mullite crystals dispersed in a silica matrix results from heat treating the slurry coating layer.

6. The method of claim 1, wherein the slurry coating comprises the second refractory material in an amount of 25 parts by weight to 130 parts by weight and the third refractory material in an amount of 20 parts by weight to 150 parts by weight with respect to the first refractory material in an amount of 100 parts by weight.

7. The method of claim 6, wherein the slurry coating layer comprises the second refractory material in an amount of 25 parts by weight to 115 parts by weight and the third refractory material in an amount of 45 parts by weight to 150 parts by weight with respect to the first refractory material in an amount of 100 parts by weight.

8. The method of claim 1, wherein:
   the mixing vessel comprises a vessel cover; and
   the method further comprises applying the slurry coating layer to a lower surface of the vessel cover.

9. The method of claim 1, wherein the method further comprises applying the slurry coating layer to a portion of the shaft above the upper interface of the glass melt with the shaft.

* * * * *